United States Patent
Wu et al.

(10) Patent No.: US 9,816,372 B2
(45) Date of Patent: Nov. 14, 2017

(54) HIGHLY-INTEGRATED WELL LOGGING SURFACE SYSTEM

(71) Applicant: Arena Petro LTD., Beijing (CN)

(72) Inventors: Jun Wu, Beijing (CN); Ming Yang, Beijing (CN); Junzhang Wu, Beijing (CN)

(73) Assignee: ARENA PETRO LTD., Beijing (CN)

(*) Notice: Subject to any disclaimer, the term of this patent is extended or adjusted under 35 U.S.C. 154(b) by 185 days.

(21) Appl. No.: 14/892,998

(22) PCT Filed: May 7, 2014

(86) PCT No.: PCT/CN2014/076976
§ 371 (c)(1),
(2) Date: Nov. 20, 2015

(87) PCT Pub. No.: WO2014/187239
PCT Pub. Date: Nov. 27, 2014

(65) Prior Publication Data
US 2016/0123138 A1 May 5, 2016

(30) Foreign Application Priority Data
May 20, 2013 (CN) .................. 2013 2 0272401 U

(51) Int. Cl.
*E21B 47/12* (2012.01)
*E21B 47/00* (2012.01)
*G01V 11/00* (2006.01)

(52) U.S. Cl.
CPC .............. *E21B 47/12* (2013.01); *E21B 47/00* (2013.01); *G01V 11/002* (2013.01)

(58) Field of Classification Search
CPC ........ E21B 47/00; E21B 47/12; G01V 11/002
See application file for complete search history.

(56) References Cited

U.S. PATENT DOCUMENTS 3,309,657 A 3/1967 Rabson
4,398,272 A * 8/1983 Sibert ................... G01V 1/44
367/25

(Continued)

FOREIGN PATENT DOCUMENTS

CN 1786412 A 6/2006
CN 201392468 Y 1/2010

(Continued)

OTHER PUBLICATIONS

Nie. Ruili, "Study and Application of Surface Digitalization Technology of Dynamic 1-13 Logging in Daqing Oilfield" Doctoral Dissertations of China University of Geoscienses. Aug. 15, 2006, see sections 2.1-2.3.

(Continued)

*Primary Examiner* — Francis Gray
(74) *Attorney, Agent, or Firm* — Koppel, Patrick, Heybl & Philpott

(57) ABSTRACT

The disclosure discloses an oil well logging surface system, which consists of a depth system, downhole power supplies, a front-end computer assembly, a control panel assembly, an expansion card module, a system power supply, a cooling system and an Electro-Magnetic Interference (EMI) system. The well logging surface system is connected with downhole instruments through a well logging cable, has functions of depth data acquisition, downhole instrument power supply, cable mode control, signal processing, downhole instrument data acquisition, data transmission and the like, may display data acquired by an internal bus on own dedicated display, and may further upload the data to upper computer software for an upper computer to process through a communication line. Different configurations of a switch on the control panel assembly are changed to select a required cable core distribution mode, power supply voltage/fre- (Continued)

quency and the like to finish various kinds of operation such as well logging, perforation and coring.

11 Claims, 1 Drawing Sheet

(56) References Cited

U.S. PATENT DOCUMENTS

| | | | | |
|---|---|---|---|---|
| 4,471,435 A | * | 9/1984 | Meisner | G01V 5/102 250/262 |
| 4,999,817 A | * | 3/1991 | Zimmer | G01V 1/245 367/65 |
| 2003/0094281 A1 | * | 5/2003 | Tubel | E21B 47/00 166/250.03 |
| 2007/0247328 A1 | * | 10/2007 | Petrovic | G01V 11/002 340/853.7 |
| 2014/0216714 A1 | * | 8/2014 | Dittmer | E21B 43/2401 166/57 |

FOREIGN PATENT DOCUMENTS

| | | |
|---|---|---|
| CN | 101881959 A | 11/2010 |
| CN | 202370502 U | 8/2012 |

OTHER PUBLICATIONS

International Search Report (Form PCT/ISA/210) for PCT/CN2014/076976 dated Aug. 4, 2014.

* cited by examiner

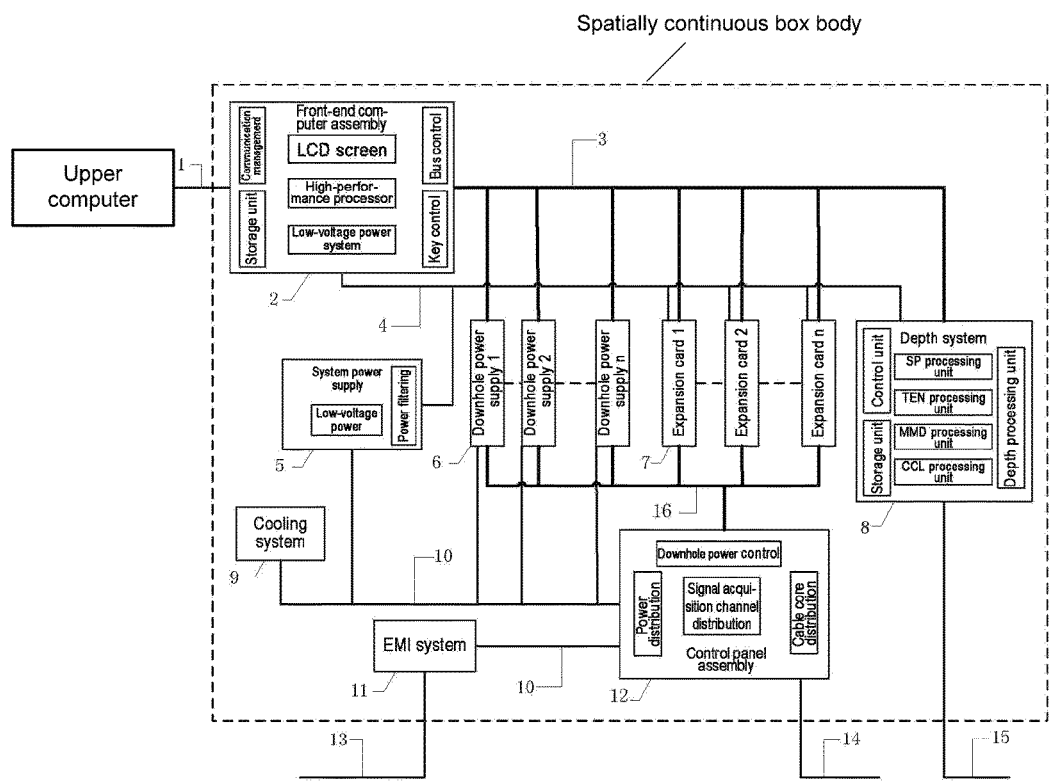

HIGHLY-INTEGRATED WELL LOGGING SURFACE SYSTEM

TECHNICAL FIELD OF THE DISCLOSURE

The disclosure relates to the field of oil well logging instruments, and may be applied to the fields of exploration well logging, production well logging, imaging well logging, well logging during drilling, horizontal well logging, perforation, coring, well testing, instrument maintenance, teaching and the like.

BACKGROUND OF THE DISCLOSURE

A conventional well logging surface system consists of multiple box bodies such as an acquisition box body, a power box body, a cable mode control box body and an oscilloscope panel. During well logging operation, the acquisition box body is mainly responsible for acquiring downhole instrument data, depth data and auxiliary variables (such as Tension (TEN) and Spontaneous Potential (SP)); the power box body is responsible for supplying power to a downhole instruments; the cable mode control box body is responsible for communicating a well logging cable with the acquisition box body and the power box body to realize the signal and power distribution of different series of instruments; and the oscilloscope panel is used by maintenance staff in case of equipment failure. Such a well logging surface system is required to be provided with many box bodies, occupies a larger space in a well logging truck, and is higher in transportation and manufacturing cost. We researches and develops a highly-integrated well logging surface system, multiple box bodies are optimally designed, and functional modules are combined, so that the size is greatly reduced, and using and maintenance cost is lowered.

The highly-integrated well logging surface system has the characteristic that each function such as downhole signal processing, data acquisition, instrument power supply, cable mode control, data transmission and perforation necessary for a well logging surface system is integrated in a case.

SUMMARY OF THE DISCLOSURE

The disclosure integrates each functional module necessary for a surface system for well logging operation into a box body to form a highly-integrated high-performance well logging surface system by utilizing the latest technologies of software, electronics, communication, power supplies and the like.

According to the technical solution of the disclosure, a highly-integrated surface system consists of a front-end computer assembly, a system power supply, a depth system, downhole power supplies, an expansion card module, a control panel assembly, a cooling system and an Electro-Magnetic Interference (EMI) system. During operation, the surface system is connected with downhole instruments through a well logging cable, and is connected with an upper computer through a communication line.

After the system is powered on, the system power supply converts external power into low-voltage working power. Most of the low-voltage working power for the system is adopted for precision measurement, high-speed communication and the like, so that it is necessary to filter the low-voltage working power, and the filtered low-voltage working power is provided for each functional module to use to ensure reliability of the system.

The front-end computer assembly consists of a high-performance processor, a Liquid Crystal Display (LCD) screen, a function button, a high-capacity memory, a communication manager and a bus controller. The high-performance processor runs operating system software and box body function management software, and displays various pieces of function information data transmitted by an internal bus on the LCD screen; the function button may perform control, rapid parameter setting and the like on the functional modules in the system independent from upper computer software; the communication line performs data communication with a host computer, and in addition, the data is stored in the high-capacity memory; and the internal bus connects the depth system, the downhole power supplies, expansion cards and the like, collects data of each module according to a set time sequence, then transmits the data to the high-performance process for processing, and further receives and allocates commands of the upper computer to each specified node.

The depth system consists of a depth processing unit, an analog signal processing unit, a control unit and a storage unit. The depth processing unit is responsible for calculating a current depth and speed in real time, and timely reporting a current working state of the depth processing unit for an operator or the upper computer software to perform related processing according to an alarming setting (such as: wellhead alarming, bottom alarming, over-speed alarming and low-speed alarming); the analog signal processing unit is responsible for acquiring a system TEN signal, an SP signal, a Magnetic Mark Detector (MMD) signal and a Casing Collar Locator (CCL) signal in real time; a TEN unit timely reports a current working state of the TEN unit for the operator or the upper computer software to perform related processing according to an alarming setting (such as: block alarming and lock alarming) in real time; the control unit controls parameters such as a gain of each channel and channel selection in the depth system to realize program control according to a command of the upper computer software; and the storage unit stores important parameters in the depth system by virtue of a high-reliability power-off storage device, and may still maintain the latest operating parameters after being powered off and re-powered on.

The downhole power supplies provide working power for the downhole instruments. A power module acquires energy from an external power supply, has functions of over-voltage and over-current protection and the like, and converts a required frequency voltage value according to a command of the upper computer software or a control panel, and in addition, various protection parameters may further be set by virtue of commands. A storage unit of the power module stores the parameters which are modified every time, and may still maintain the latest operating parameters after being powered off and re-powered on.

The expansion card module may be configured with 1 to N (N is smaller than 32) expansion cards, and after being powered on, the expansion cards perform data exchange with the front-end computer assembly through the internal bus by: reporting current card slot locations where the expansion cards are located and other own information to the front-end computer assembly and then receiving configuration commands of the front-end computer assembly to finish initialization configuration. After configuration, the expansion cards and the other nodes in a box body work according to a set bus time sequence. An internal bus protocol may automatically identify locations of the expansion cards, and the bus protocol is associated with the card slot locations, so that multiple function expansion cards which are the same may be inserted into the expansion card module, and one of the same function expansion cards may be selected as an effective card by virtue of card forbidding and awakening functions of the bus protocol.

Each acquisition board and power supply in the whole system may transmit waveform data of specified test points according to the commands of the software and display the waveform data on the upper computer to regulate parameters and diagnose or eliminate failures, so that an independent oscilloscope panel may be replaced.

In an operation process, the operator selects a required cable conductor allocation mode, required power supply voltage/frequency and the like through a switch on the control panel assembly or the commands of the upper computer software.

BRIEF DESCRIPTION OF THE DRAWINGS

FIG. 1 is a structure diagram of a highly-integrated surface system according to the disclosure. Description about reference signs in the drawings: 1—communication line, 2—front-end computer assembly, 3—internal bus, 4—low-voltage power network, 5—system power supply, 6—downhole power supply, 7—expansion card module, 8—depth system, 9—cooling system, 10—alternating current power network, 11—EMI system, 12—control panel assembly, 13—alternating current power line, 14—well logging cable, 15—depth system signal wire and 16—functional wire harness.

DETAILED DESCRIPTION OF THE EMBODIMENTS

As shown in the drawing, a depth system (8), downhole power supplies (6) and an expansion card module (7) are connected with a front-end computer assembly (2). The depth system (8) acquires an instruction from an internal bus (3), and uploads a data packet; the downhole power supplies (6) also acquire instructions through the internal bus (3), upload information of working voltage of the power supplies, current, frequency, waveform, protection parameters and the like, and provide power with specified voltage/frequency/current for a well logging cable (14) through a control panel assembly (12); and the expansion card module (7) acquires an instruction from the internal bus (3), uploads data of downhole instruments, and sends downhole instrument instructions to the well logging cable (14) to control the downhole instruments through the control panel assembly (12) after receiving the downhole instrument instructions.

The depth system (8) acquires various signals to be measured from a depth system signal wire (15), and uploads the signals to the front-end computer assembly (2) through the internal bus (3) after internal processing and acquisition.

A system power supply (5) obtains alternating current power from the control panel assembly (12) through an alternating current power network (10), converts the alternating current power into low-voltage power required by the work of the modules in the system, and filters and provides the low-voltage power for each module in the system to use.

The control panel assembly (12) realizes functions of cable core distribution, alternating current power distribution, downhole instrument signal acquisition channel distribution, downhole instrument power-on, power-off and polarity selection and the like, and connects the downhole instruments with the surface system through the well logging cable (14).

A cooling system (9) starts working to cool the whole system after acquiring to alternating current voltage from the alternating current power network (10).

An EMI system (11) acquires system working alternating current power from an alternating current power line (13), and filters and provides the system working alternating current power for the control panel assembly (12), and then the control panel assembly (12) distributes and provides the system working alternating current power for each module in the system to use.

When a certain signal of the system is required to be monitored, an operator transmits a command through host computer software, the front-end computer assembly (2) forwards the command to a specified expansion card (7) or downhole power supply (6) after receiving the command, the expansion card (7) or the downhole power supply (6) transmits data waveform of a test point to the front-end computer assembly (2), and the data waveform of the test point is finally transmitted to the host computer software to be displayed for the operator to judge whether the signal meets a requirement or not through a communication line (1).

What is claimed is:

1. A highly-integrated well logging surface system, consisting of a depth system, a system power supply, downhole power supplies, a front-end computer assembly, an expansion card module, a control panel assembly, a cooling system and an Electro-Magnetic Interference (EMI) system, wherein the front-end computer assembly is connected with the depth system, the downhole power supplies and the expansion card module through an internal bus in a spatially continuous box body; and the control panel assembly is connected with the downhole power supplies and the expansion card module through a functional wire harness;
wherein there is 1 to N expansion card module used at the same time, N is smaller than 32, and the expansion cards may automatically report own information to the front-end computer assembly and finish automatic configuration; and the N expansion cards in the expansion card module may be plugged and unplugged for replacement at any time by a user under the condition of not opening a case cover.

2. The system according to claim 1, wherein the depth system, the downhole power supplies and the expansion card module upload data acquired by the modules after obtaining data uploading communication instructions from the front-end computer assembly, and execute operation after obtaining control instructions.

3. The system according to claim 1, wherein the downhole power supplies may be configured into 1 to N paths of power output, N is smaller than 8, and each of the downhole power supplies may regulate output voltage, frequency, current and protection parameters by virtue of a command of upper computer software or the control panel assembly.

4. The system according to claim 1, wherein the control panel assembly realizes cable core distribution and downhole instrument power supply according to different well logging modes.

5. The system according to claim 1, wherein the front-end computer assembly may regulate configuration parameters of the depth system, the downhole power supplies and the expansion card module independent from an upper computer, and displays the parameters on own dedicated display; and the front-end computer assembly may further report all configuration information and parameters of the box body, upload data and transmit the commands after being connected with the upper computer.

6. The system according to claim 1, wherein the downhole power supplies or the expansion card module automatically acquire waveforms of key test points on the downhole power supplies or the expansion card module and transmit the waveforms to a front-end computer or the upper computer to be displayed for parameter regulation or failure diagnosis according to requirements on the premise of independence from other external hardware.

7. The system according to claim 1, wherein the front-end computer assembly is provided with a high-capacity data memory capable of preventing data loss in case of power failure, acquired ground and downhole data may be transmitted to the host computer through a communication line and simultaneously recorded in real time to analyze whether a well logging process meets a requirement in a technical specification or not after well logging operation is finished, and historical well logging data may be completely stored and recorded in case of power failure.

8. The system according to claim 1, wherein:
a front-end computer assembly, configured to allocate commands of an upper computer to at least one specified node, acquire function information data which corresponds to the commands and are uploaded by the specified nodes, and allocate software commands corresponding to the function information data to the specified nodes to control downhole instruments;
wherein the specified nodes comprise: downhole power supplies and/or an expansion card module, and a depth system;
the depth system is connected with the front-end computer assembly through an internal bus, and is configured to upload acquired various signal data corresponding to the commands to the front-end computer assembly, and control operation over a gain of each channel and channel selection in the depth system according to the software commands;
the expansion card module is connected with the front-end computer assembly through the internal bus, and is configured to transmit downhole instrument data corresponding to the commands to the front-end computer assembly, and control the downhole instruments by virtue of the software commands;
the downhole power supplies are connected with the front-end computer assembly through the internal bus, and are configured to transmit power data corresponding to the commands to the front-end computer assembly, and control power energy supply by virtue of the software commands; and
the function information data comprises: the various signal data, the downhole instrument data and the power data.

9. The system according to claim 8, wherein the depth system acquires the various signal data from a depth system signal wire, and uploads the various signal data to the front-end computer assembly through the internal bus.

10. The system according to claim 8, wherein:
the expansion card module transmits the software commands to a well logging cable to control the downhole instruments through the control panel assembly; and
the downhole power supplies provide power for the well logging cable according to the software commands through the control panel assembly.

11. The system according to claim 8, comprising:
an Electro-Magnetic Interference (EMI) system, the EMI system acquiring system working alternating current power from an alternating current power line, filtering the system working alternating current power to obtain alternating current power and providing the alternating current power for the control panel assembly;
the control panel assembly, connected with the EMI system and configured to perform cable core distribution, alternating current power distribution and signal channel distribution for the highly-integrated well logging surface system; and
a system power supply, which acquires the alternating current power from the control panel assembly through an alternating current power network, converts the alternating current power into low-voltage power and provides power for each module in the system.

* * * * *